United States Patent [19]

Eisenlohr et al.

[11] 3,869,377
[45] Mar. 4, 1975

[54] PRODUCTION OF EXTRAPURE AROMATICS

[75] Inventors: Karl-Heinz Eisenlohr, Buchschlag; Helmut Markwort; Berthold Scholz, both of Weisskirchen, all of Germany

[73] Assignee: Metallgesellschaft Aktiengesellschaft, Frankfurt am Maine, Germany

[22] Filed: Dec. 13, 1972

[21] Appl. No.: 314,636

[30] Foreign Application Priority Data
Dec. 14, 1971 Germany............................ 2161973

[52] U.S. Cl.................. 208/66, 208/95, 208/96, 260/674 H
[51] Int. Cl............................................. C10g 39/00
[58] Field of Search ............ 208/62, 66; 260/674 H, 260/673.5

[56] References Cited
UNITED STATES PATENTS

| | | | |
|---|---|---|---|
| 2,894,048 | 7/1959 | Shuman | 260/674 A |
| 3,204,006 | 8/1965 | Broughton | 260/674 H |
| 3,351,547 | 11/1967 | Drehman et al. | 208/62 |
| 3,542,667 | 11/1970 | McMahon et al. | 208/62 |
| 3,699,181 | 10/1972 | Kmecak et al. | 260/674 H |

Primary Examiner—Herbert Levine
Attorney, Agent, or Firm—Burgess, Dinklage & Sprung

[57] ABSTRACT

In a process for producing substantially pure aromatics wherein a gaseous reaction mixture which contains hydrogen, olefins, diolefins and aromatic compounds is subjected to a hydroforming operation, and wherein subsequently the aromatics are separated in the substantially pure state from the hydroformate, the improvement which comprises cooling the hydroformate to a temperature of 100 to 400°C directly after hydroforming and passing it still in gaseous state through a reactor filled with a hydrogenation catalyst under a pressure which differs from that under which the hydroforming operation was performed by not more than 10 atmospheres, whereby the olefins and diolefins are substantially eliminated.

11 Claims, 1 Drawing Figure

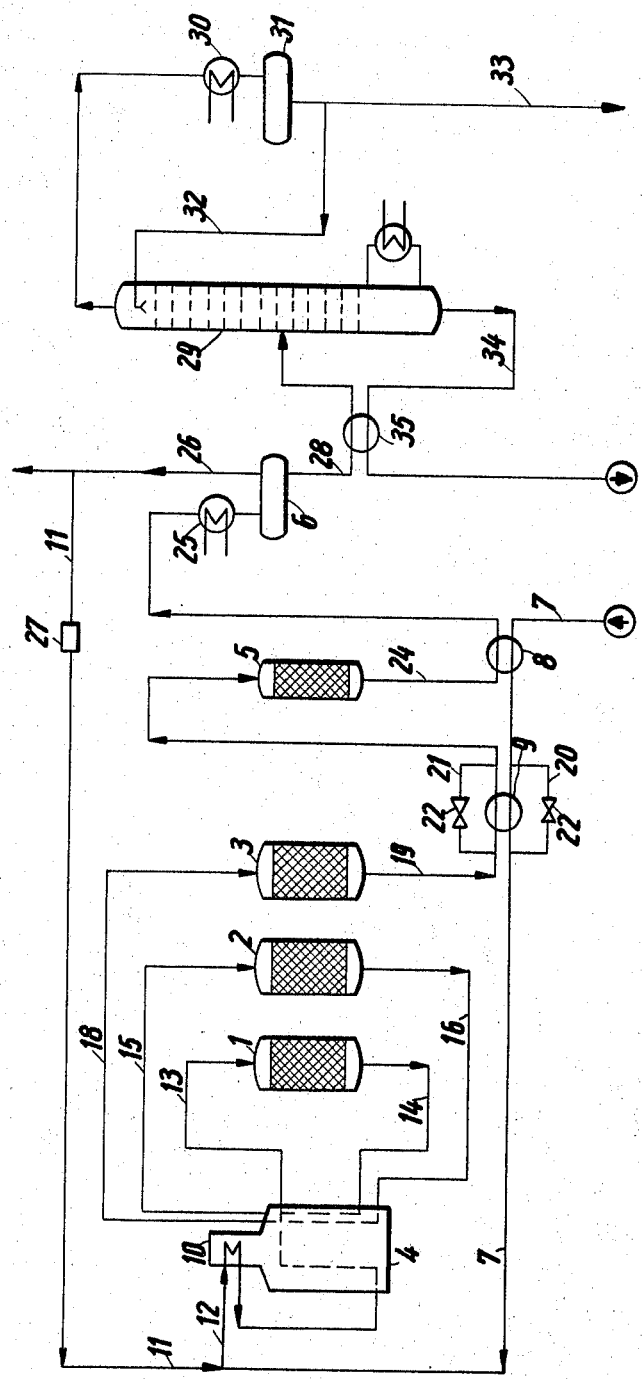

PRODUCTION OF EXTRAPURE AROMATICS

This invention relates to a process for the production of extrapure aromatics.

Highly pure aromatic hydrocarbons, particularly benzene and its alkylated homologues, are feed materials used for the production of numerous chemical intermediates, such as caprolactam, maleic anhydride, phthalic acid, terephthalic acid and others. For their employment in such processes the aromatic hydrocarbons are required to satisfy extremely high standards of purity.

Starting materials available for the production of benzene and benzene homologues are coke oven benzene, pyrolytic benzene and hydroformates. Hydroformates are the reaction product of the catalytic conversion of naphthenes, in which saturated carbocyclic compounds are dehydrogenated to aromatic hydrocarbons in the presence of hydrogen and converted to aliphatic open-chain hydrocarbons, hydroforming being one of the few processes in the refining of petroleum in which molecular hydrogen is formed. The reaction is endothermic and is performed at a temperature of 500° to 600°C. at a pressure from 15 to 70 atm.gauge, the hydrogen partial pressure being from 10 to 40 atm.gauge. The catalysts that are employed contain metals of the platinum group, particularly platinum, palladium or rhenium on a ceramic carrier material. In view of the reaction conditions, the hydroformates might be expected to contain no unsaturated aliphatic compounds. However, it has been well known for many years that hydroformates may and do contain olefins and even diolefins.

The production of extrapure aromatics from their mixtures with non-aromatic hydrocarbons is principally accomplished by extraction or extractive distillation with a selective solvent for aromatics. Solvents or solvent mixtures are used which boil substantially above the boiling point or boiling range of the aromatics that are to be recovered. The selectivity of many solvents for aromatics over non-aromatics can be improved by the addition of water. In view of the similarity of the molecular structures, the selectivity of a solvent for aromatics may be expected to be better in relation to hydrocarbons than in relation to olefins, and least in relation to diolefins, particularly when these have conjugated double bonds.

Coke oven benzene and pyrolytic benzene are rich in olefins and diolefins. Since they also contain organic compounds which contain sulphur, nitrogen and oxygen, they are submitted, prior to the recovery of the aromatics, to hydrogenating refining for the purpose of decomposing the hetero compounds with the formation of hydrogen sulphide, ammonia and water. This hydrogenating refining process also causes the diolefins and a major proportion of the olefins to be hydrogenated so that the selectivity of the solvent for aromatics in the presence of olefins and diolefins does not greatly matter.

Surprisingly it has been found that the content of diolefins in hydroformates must not be neglected if very pure aromatics are to be obtained.

The demands relating to quality which extrapure aromatics are expected to satisfy not only require that the maximum content of non-aromatics should not exceed 0.5 percent but that the content of olefins and diolefins should also be very low. The maximum contents for the several aromatic compounds are prescribed and for the purest benzene they are 50 ppm. of olefins and 100 ppm. of diolefins.

The content of olefins and diolefins in pure aromatics is measured in terms of bromine consumption (3 Br/100 ml., DIN 51 763; ASTM D–1491 and 1492). Another method is the colorimetric method known as the sulphuric acid test which uses a potassium bichromate solution as a reference solution, (DIN 51 762; ASTM D–848) and which is particularly sensitive to diolefins.

It has been the practice for a long time to eliminate traces of diolefins and olefins from aromatics that have been recovered by extraction, extractive distillation or fine distillation, by treating them with Fuller's Earth or by submitting them to a sulphuric acid wash. Both methods involve the employment of a considerable amount of apparatus and a continuous consumption of chemicals besides requiring a waste disposal problem to be solved.

In the recovery by solvent extraction of benzene, toluene and xylene from hydrocarbon fractions containing aromatics, olefins and diolefins entering the extract, in the course of fractionation of the extract, appear to accumulate in the first runnings of the several fractions, i.e., in the lightest boiling part of the extract as well as in the intermediate fractions between benzene and toluene on the one part and toluene and xylene on the other part, and that these first runnings can be reintroduced into the solvent extraction as an extract reflux. This procedure is applicable only to solvent extraction and may necessitate maintaining disproportionately large volumes of extract in circulation as reflux in order to ensure that the olefins and diolefins are completely removed together with the intermediate fractions.

This effort which is necessary for the elimination from the extract of traces of unsaturated aliphatics is a factor which is all the more important in the recovery of aromatics from hydroformates because these constitute a hydrocarbon mixture in which the naphthenes fall far short of the aromatics and paraffins, a circumstance which greatly facilitates and simplifies the separatory task the extraction or extractive distillation process is intended to perform. The relatively high expenditure in means needed for the extractive recovery of aromatics from hydroformates, such as those due to a high extract reflux, treatment of the extract with Fuller's Earth and so forth, is actually caused by the accompanying olefins and diolefins.

It has been found that the small residual contents of diolefins and olefins in hydroformates, which cannot be otherwise kept out of the aromatics extract in the following extractive recovery of the aromatics than by a disproportionately high expenditure in means, can in fact be eliminated by a simple hydrogenation in contact with suitable catalysts at a pressure which differs by not more than 10 atmospheres from the pressure of the hydroforming process, and at lower temperatures between 100° and 400°C..

Catalysts which are suitable contain metals of the 6th and 8th Groups of the Periodic Table in the form of their oxides on a preferably neutral oxidic carrier material. Catalysts containing cobalt molybdate on a carrier of alumina have given an excellent account of themselves.

In "Die katalytische Druckhydrierung von Kohlen, Teeren und Mineralolen" (published by Springer, Berlin, Goettingen, Heidelberg, 1950) W. Kronig describes the DHD process (pp 146 et seq.) as a precursor of modern hydroforming processes. In this process, the reaction product of dehydrogenation was hydrogenated at low temperature in contact with a catalyst of the same kind in order to eliminate unsaturated aliphatics and gum-forming substances. This old process was based on the treatment of sulphur-containing input stocks and made use of catalysts containing molybdenum or tungsten in sulphide form, which rely on a given minimum content of sulphur in the processed hydrocarbon mixture. The noble metal catalysts which are used in the modern hydroforming processes, and which are intended to cyclise paraffins and subsequently to dehydrogenate the naphthenes that form, require a sulphur-free stock and cannot be combined with a catalyst containing molybdenum or tungsten in sulphide form in a following hydrogenation stage from which hydrogen-bearing residual gas is recycled into the hydroforming process.

Catalysts containing oxides of metal of the 6th and 8th Groups of the Periodic Table, particularly cobalt and molybdenum, are well known and are used as protective catalysts in the final purification of gas for the purpose of destroying nitrogen oxides, of polymerising resin forming substances and so forth. They have not so far proved useful as hydrogenation catalysts.

According to the present invention there is provided a process for producing substantially pure aromatic compounds, wherein a gaseous reaction mixture which contains hydrogen and aromatic compounds and which has been subjected to a hydroforming operation, is cooled to a temperature of 400° to 100°C., and passed through a reactor filled with a hydrogenation catalyst under a pressure which differs from that under which the hydroforming operation was performed by not more than 10 atmospheres, and wherein the aromatic compounds are separated in the substantially pure state from the hydrogenated hydroformate.

The reaction mixture is preferably cooled to a temperature of 200° to 380°C..

One or more oxides of metals of the 6th and/or 8th Group of the Periodic System may be used as hydrogenation catalysts, oxides of molybdenum and cobalt having given particularly good results, and a preferred catalyst being one containing 4 percent by weight cobalt oxide and 10 percent by weight molybdenum oxide.

The hydrogenation catalyst is preferably supported on a carrier, preferably one containing aluminum oxide.

The space velocity through the hydrogenation catalyst is conveniently 1 to 8, preferably 3 to 6 kg. of hydroformate per liter of catalyst per hour.

In one embodiment of the present process, the pressure over the hydrogenation catalyst is the same pressure as that under which the hydroforming operation was performed.

The aromatic compounds are preferably separated by extraction. It is however also possible to divide the mixture by distillation into fractions each of which contains only aromatic components containing a determined number of carbon atoms.

Alternatively, the aromatic compounds can be separated from such fractions by extractive distillation and benzene can be extracted by crystallisation from fractions containing benzene.

p-Xylene can also be separated by distillation from fractions containing $C_8$ aromatic compounds. It is also possible to separate the p-xylene from the $C_8$ fraction by means of molecular sieves.

In carrying out the present process, a hydrogen rich reaction mixture which is obtained in conventional manner in contact with a noble metal catalyst at a temperature of 500° to 600°C. and at a pressure from 15 to 50 atm.gauge at a hydrogen partial pressure of 10 to 40 atm. is conducted, after first having been cooled to a temperature below 400°C. and down to about 100°C., preferably to from 380° to 200°C., over a catalyst containing an oxide of a metal of the 6th and/or 8th Group of the Periodic System, preferably molybdenum and cobalt, and then cooled by decompression, whereupon the residual gas is recycled into the hydroforming process and the stabilised liquid product taken to extractive recovery of the aromatics. The space velocity depends upon the hydroforming process employed and the hydrogen partial pressure in the process and is preferably in the range of 1 to 8, more preferably 3 to 6 kg. of hydroformate per liter of catalyst per hour.

An advantage of the present process is that the necessary conditions for the hydrogenation of olefins and diolefins with reference to pressure and hydrogen content are present in the reaction mixture leaving the hydroforming reactor and that the hydrogenation catalyst can be located in a suitable temperature range in the cooling path leading to the further processing plant.

Owing to the low concentration of the components that are to be hydrogenated, the consumption of hydrogen and the generation of heat of hydrogenation are negligibly small. The fact that hydrogen is consumed in the hydrogenation does not substantially effect the overall process because the hydroforming reaction produces surplus hydrogen in any event.

In order to enable the invention to be more readily understood, reference will now be made to the accompanying drawing, which illustrates diagrammatically and by way of example a flow sheet of plant for performing the process according to the present invention.

Referring now to the drawing, the plant thereshown substantially consists of hydroforming reactors 1, 2 and 3 and an associated preheater 4, a hydrogenation reactor 5 and a separator 6.

The initial feed used for the hydroforming reaction is conducted through a pipe 7 and heat exchangers 8 and 9 to the preheater 4. Before entering a convection zone 10 of the preheater, the feed is augmented by the admixture of recycle gas which is rich in hydrogen, and which arrives through a pipe 11. The preheated mixture which is now rich in hydrogen is taken through a pipe 12 to a first preheater zone where it is raised to the reaction temperature in the first hydroformer 1 which it reaches through a pipe 13. Since the hydroforming reaction is endothermic, the reaction mixture in reactor 1 becomes cooler. It is taken through a pipe 14 to a second preheater stage before being introduced through a pipe 15 into the next hydroformer 2 after having been reheated. From the latter reactor, the reaction mixture flows through a pipe 16, a third preheater stage and a pipe 18 to the last hydroformer 3. From here, the reaction product of the hydroforming reaction is taken through a pipe 19 and the heat exchanger 9 to the hydrogenation reactor 5. In the heat exchanger 9 the reaction product is indirectly cooled by the inflowing feed in pipe 7 to the temperature suitable for hydrogenation. In order to permit this temperature to be controlled, by-passes 20 and 21 containing adjustable throttle valves 22 are provided in pipes 7 and/or 19 and enable the proportions of feed and reaction products flowing through the heat exchanger 9 to be varied within wide limits.

The reaction mixture leaving the hydrogenation reactor 5 through a pipe 24 is taken through the heat exchanger 8 and a cooler 25 into the separator 6. In the heat exchanger 8, the hydrogenated reaction mixture is precooled by the cold inflowing feed and cooling is continued to ambient temperature in the cooler 25. In the separator 6, the gas is separated from the condensed hydrogenated hydroformate and exhausted through a pipe 26. A branch stream is recycled through the pipe 11 by a recirculating compressor 27 for admixture with the inflowing feed in pipe 7 before entering the preheater 4. The liquid reaction product collecting in the separator 6 is taken through a pipe 28 to a stabilising column 29 in which low boiling hydrocarbons are driven off overhead. These products are condensed in a condenser 30, collected in a receiver 31, partly returned through a pipe 32 to the stabilising column 29 as reflux and partly discharged through a pipe 33.

The bottoms product of the stabilising column 29 is withdrawn through a pipe 34. If this product is to be directly reintroduced into an extraction plant for aromatics it may first be cooled in a heat exchanger 35 by the cold reaction product flowing into the stabilising column through a pipe 28. However, if desired, it may be directly taken by the pipe 34 to a further distillation column from which overhead and/or side fractions that are particularly suitable for solvent extraction can be obtained.

In order that the invention may be more readily understood an illustrative example of the process will be described.

Example

This example is a description of a comparative test in which a hydroformate produced in conventional manner over a platinum-containing catalyst is used for the recovery therefrom of extrapure aromatics by solvent extraction with or without having been previouly submitted to the rehydrogenation proposed by the present invention.

A 60 : 40 N-methylpyrrolidone-glycol mixture was used as a feed for the extractive recovery of the aromatics. The solvent ratio was 6.5 kg. of solvent per kg. of aromatics in the charged mixture. The solvent extractor employed had 22 stages and the charged mixture was introduced at the 9th stage. The non-hydrogenated reformate had the following characteristics:

| | |
|---|---|
| $D_{15}°$ | 0.763 kg./liter |
| Boiling range (ASTM) | 49 – 160°C. |
| Benzene | 7.2% by weight |
| Toluene | 16.9% by weight |
| $C_8$-aromatics | 20.8% by weight |
| $C_9$-aromatics | 6.6% by weight |
| Non-aromatics | 48.4% by weight |

The bromine number was 4.3 g. Br per 100 g. reformate (DIN 51 764). The sulphuric acid test gave a chromate value of 1.5 g. $K_2Cr_2O_7$ per liter.

A proportion of this reformate was directly introduced into the solvent extraction. From the extract thus obtained benzene, toluene and the xylenes were recovered by fractionation.

In these extrapure fractions the bromine consumption (DIN 51 763) and the chromate value obtained by a sulphuric acid test (DIN 51 762) were as follows:

| | Bromine consumption | $H_2SO_4$ test (chromate value) |
|---|---|---|
| Benzene | 0.02 | 0.4 |
| Toluene | 0.09 | 0.5 |
| Xylene | (not determined) | 0.4 |

It is the usual practice to determine the content of olefins and diolefins in hydrocarbon mixtures containing aromatics, for instance in carburettor fuels, by their bromine number, g. Br/100 g. hydrocarbons (according to DIN 51 764) but in the case of aromatics as the bromine consumption, g. Br/100 ml. (according to DIN 51 763).

Another portion was hydrogenated before being submitted to extraction. This involved passing 2 kg. of reformate and 6,900 liters (S.T.P.) of gas bearing 67 percent by volume of hydrogen and 33 precent by volume of methane at a pressure of 20 atm.gauge, after having been heated to 320°C., over 0.5 liter of a catalyst containing 4 percent by weight of cobalt and 10 percent by weight of molybdenum trioxide $MoO_3$ on an alumina carrier. (Space velocity 4 kg. of reformate per liter of catalyst per hour). These reaction conditions correspond to those existing in the hydrogenation reactor of a large capacity plant, such as that illustrated in FIG. 1.

The cooled condensate, after separation from the gas phase, had a bromine number of 1.4 g. bromine per 100 g. (compared with 4.3 of the portion that had not been hydrogenated) and a sulphuric acid reaction of 0.4 (compared with 1.5 g. in the non-hydrogenated portion).

The hydrogenated portion was separated into non-aromatics and aromatics by solvent extraction under the same conditions as the non-hydrogenated portion. The aromatics-containing extract was separated into benzene, toluene and xylene by fractional distillation. The bromine consumption and chromate value in a sulphuric acid test are listed hereunder, the corresponding values appertaining to the non-hydrogenated portion being shown in brackets in the second column.

| | Bromine consumption | Sulphuric acid test |
|---|---|---|
| Benzene | 0.003 (0.02) | less than 0.1 (0.4) |
| Toluene | 0.035 (0.09) | 0.1 (0.5) |
| Xylene | not determined | 0.2 (0.4) |

What we claim is:

1. In a process for producing substantially pure aromatics whereins a gaseous reaction mixture which contains hydrogen, olefins, diolefins and aromatic compounds is subjected to a hydroforming operation with a noble metal catalyst at about 500° to 600°C and a pressure of about 15 to 50 atmospheres, and wherein subsequently the aromatics are separated in the substantially pure state from the hydroformate, the improvement which comprises cooling the hydroformate to a temperature of 100 to 400°C directly after hydroforming and passing it still in gaseous state through a reactor filled with a hydrogenation catalyst comprising cobalt and molybdenum on an inorganic oxide carrier under a lower pressure than the hydroforming operation, whereby the olefins and diolefins are substantially eliminated.

2. A process as claimed in claim 1, wherein the hydrogenation catalyst is one or more oxides of metals of the 6th and/or 8th Group of the Periodic System.

3. A process as claimed in claim 1, wherein the hydrogenation catalyst contains 4 percent by weight cobalt oxide and 10 percent by weight molybdenum oxide.

4. A process as claimed in claim 1, wherein the hydrogenation catalyst is supported on a carrier containing aluminum oxide.

5. A process as claimed in claim 1, wherein the space velocity through the hydrogenation catalyst is 1 to 8 kg. of hydroformate per liter of catalyst per hour.

6. A process as claimed in claim 1, wherein the space velocity through the hydrogenation catalyst is 3 to 6 kg. of hydroformate per liter of catalyst per hour.

7. A process as claimed in claim 1, wherein the pressure over the hydrogenation catalyst is the same pressure as that under which the hydroforming operation was performed.

8. A process as claimed in claim 1, wherein the aromatic compounds are separated from the hydrogenated hydroformate by extraction.

9. A process as claimed in claim 1, wherein the aromatic compounds are separated from the hydrogenated hydroformate by extractive distillation.

10. A process as claimed in claim 1, wherein the aromatic compounds are separated from the hydrogenated hydroformate by molecular sieves.

11. A process as claimed in claim 1, wherein the aromatic compounds are separated from the hydrogenated hydroformate by distillation and crystallisation.

* * * * *